(12) United States Patent
Lee et al.

(10) Patent No.: US 9,793,650 B2
(45) Date of Patent: Oct. 17, 2017

(54) COMMUNICATION MODULE ASSEMBLY

(71) Applicant: SOLID, INC., Gyeonggi-do (KR)

(72) Inventors: Dong Won Lee, Gyeonggi-do (KR); So Yeon Won, Gyeonggi-do (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 14/411,483

(22) PCT Filed: Apr. 15, 2014

(86) PCT No.: PCT/KR2014/003265
§ 371 (c)(1),
(2) Date: Dec. 26, 2014

(87) PCT Pub. No.: WO2015/156441
PCT Pub. Date: Oct. 15, 2015

(65) Prior Publication Data
US 2017/0018876 A1    Jan. 19, 2017

(30) Foreign Application Priority Data
Apr. 8, 2014 (KR) .......................... 10-2014-0041801

(51) Int. Cl.
*H01R 13/631* (2006.01)
*H04Q 1/02* (2006.01)
(Continued)

(52) U.S. Cl.
CPC ........... *H01R 13/631* (2013.01); *H01R 25/16* (2013.01); *H04Q 1/02* (2013.01); *H01R 9/26* (2013.01)

(58) Field of Classification Search
CPC ........ H01R 13/631; H01R 25/16; H01R 9/26; H04Q 1/02
(Continued)

(56) References Cited

U.S. PATENT DOCUMENTS 3,267,334 A * 8/1966 Wulc ..................... H05K 7/023
361/729
3,299,403 A * 1/1967 Young .................... H03M 7/00
340/12.18
(Continued)

OTHER PUBLICATIONS

International Search Report issued in PCT/KR2014/003265 mailed Apr. 15, 2014.
(Continued)

*Primary Examiner* — Alexander Gilman
(74) *Attorney, Agent, or Firm* — Sughrue Mion, PLLC

(57) ABSTRACT

The present invention relates to a communication module assembly. The present invention is a communication module assembly which is electrically connected to a communication device and is supplied with power and signal, and can include a connection port unit that is supplied with the power and the signal from the communication device; a cable connection portion which is provided in the connection port unit, and to which cables electrically connected to the communication device is connected; a plurality of communication modules that is stacked on and connected to the connection port unit in a plug-in type; and a guide means for guiding the communication module such that the communication modules are connected to the connection port unit in a central direction.

5 Claims, 6 Drawing Sheets

(51) Int. Cl.
*H01R 25/16* (2006.01)
*H01R 9/26* (2006.01)

(58) Field of Classification Search
USPC .................... 439/374, 717, 761, 729
See application file for complete search history.

(56) References Cited

U.S. PATENT DOCUMENTS

| | | | | |
|---|---|---|---|---|
| 4,918,572 | A * | 4/1990 | Tarver | G06F 1/18 361/736 |
| 5,067,040 | A * | 11/1991 | Fallik | G06F 1/20 361/679.48 |
| 5,227,957 | A * | 7/1993 | Deters | G06F 1/181 312/223.2 |
| D371,768 | S * | 7/1996 | Kammersgard | D14/313 |
| 5,676,553 | A * | 10/1997 | Leung | H01R 31/005 439/74 |
| 5,984,732 | A * | 11/1999 | Mehring | H05K 5/0021 439/701 |
| 6,059,614 | A | 5/2000 | Shelby | G06F 13/4095 361/735 |
| 6,456,495 | B1 * | 9/2002 | Wieloch | H05K 7/1468 312/215 |
| 6,469,901 | B1 * | 10/2002 | Costner | G06F 1/18 361/730 |
| 6,473,297 | B1 * | 10/2002 | Behl | G06F 1/184 361/679.33 |
| 6,490,157 | B2 * | 12/2002 | Unrein | G06F 1/16 312/223.2 |
| 6,574,110 | B1 * | 6/2003 | Budinger | H05K 7/1454 361/727 |
| 6,839,238 | B2 * | 1/2005 | Derr | H05K 5/0021 361/728 |
| 7,008,233 | B1 * | 3/2006 | Ruff | H05K 7/1421 244/118.5 |
| 7,027,595 | B2 * | 4/2006 | Miyazaki | H04Q 1/10 379/325 |
| 7,099,151 | B2 * | 8/2006 | Jones | H05K 5/0021 361/679.02 |
| 7,184,272 | B1 * | 2/2007 | Harlacher | H05K 7/023 361/728 |
| 7,307,834 | B2 * | 12/2007 | Jones | H05K 5/0021 361/679.55 |
| 7,499,282 | B1 * | 3/2009 | Loucks | G06F 1/1626 361/730 |
| 7,589,974 | B2 * | 9/2009 | Grady | H05K 7/1492 174/520 |
| 2002/0180554 | A1 * | 12/2002 | Clark | H05K 7/1452 333/33 |
| 2016/0073542 | A1 * | 3/2016 | Huang | H05K 7/1422 361/781 |

OTHER PUBLICATIONS

Written Opinion issued in PCT/KR2014/003265 mailed Dec. 15, 2014.

* cited by examiner

COMMUNICATION MODULE ASSEMBLY

TECHNICAL FIELD

The present invention relates to a communication module assembly, and more particularly, to a communication module assembly that is capable of miniaturizing an overall device, by implementing a configuration in which communication modules are connected to connection ports in a plug-in type to minimize a space required for connecting and disconnecting operations of cables.

BACKGROUND ART

In general, inside the communication devices, a plurality of cables is used to connect power and signal between several mounted communication modules. When the cables are used in this way, since there is a basic need for an operation space for fastening and disconnecting the cables, relatively much space is required. Furthermore, since there is a need to be able to connect the cables after mounting the communication module, the position of the connecting port is also limited only to the front or the side that allows the check.

In addition to spatial limitations as described above, in order to mount and dismount the communication module in the production process, since it is necessary to assemble and disassemble the plurality of cables, it takes a lot of time, which leads to a problem of an increase in production costs.

In addition, if the communication module of the plug-in type is used, when mounting the communication modules, the connection port is disposed on an opposite side of a surface as viewed from an operator side. Therefore, there is a need for a structure which can serve as a guide so that the communication modules can be mounted at the appropriate positions. As a method for guiding the mounting position, a method of using a guide rail and a guide pin is the most general. However, in order to implement such a guide structure, since an additional space is required for the module and the housing, and in some cases, another structure needs to be added, there is a difficulty to be implemented in a device of a limited size.

DISCLOSURE

Technical Problem

Therefore, an object of the present invention is to solve the problems of the prior art as described above and to provide a communication module assembly that is capable of miniaturizing an overall device, by implementing a configuration in which communication modules are connected to connection ports in a plug-in type to minimize a space required for connecting and disconnecting operations of cables.

Technical Solution

According to an aspect of the present invention for achieving the above-mentioned object, there is provided a communication module assembly which is electrically connected to a communication device and is supplied with power and signal, the communication module assembly may include a connection port unit that is supplied with the power and the signal from the communication device; a cable connection portion which is provided in the connection port unit, and to which cables electrically connected to the communication device is connected; a plurality of communication modules that is stacked on and connected to the connection port unit in a plug-in type; and a guide means for guiding the communication module such that the communication modules are connected to the connection port unit in a central direction.

According to another aspect of the present invention, the connection port unit is constituted by a pair that is formed long in a vertical direction, and both sides of the plurality of communication modules may be connected to the connection port unit, respectively.

According to another aspect of the present invention, the connection port unit may be provided with a plurality of connection ports at a predetermined interval.

According to another aspect of the present invention, all or a part of the connection ports may be provided to be movable vertically and horizontally and back and forth.

According to another aspect of the present invention, a heat sink for heat dissipation is installed to be adjacent to the communication modules, and the connection port unit may be fixedly coupled to the heat sink.

According to another aspect of the present invention, the guide means may include guide protrusions provided to protrude from one end of the communication module; and a guide bracket that is coupled to the heat sink to support lower ends of the guide protrusions.

According to another aspect of the present invention, both side ends of the guide protrusions are formed to be inclined so as to approach each other as they go downward, and the guide bracket may be formed to correspond to the guide protrusions.

It should be understood that different embodiments of the invention, including those described under different aspects of the invention, are meant to be generally applicable to all aspects of the invention. Any embodiment may be combined with any other embodiment unless inappropriate. All examples are illustrative and non-limiting.

Advantageous Effects

According to the present invention, it is possible to miniaturize the overall device, by implementing the configuration in which the communication modules are connected to the connection ports in a plug-in type to minimize the space required to connecting and disconnecting operations of the cables.

Also, since is not necessary to perform additional operation at the time of connecting and disconnecting operations of the cables, it is possible to minimize the operation time.

BEST MODE FOR THE INVENTION

Figure 1:
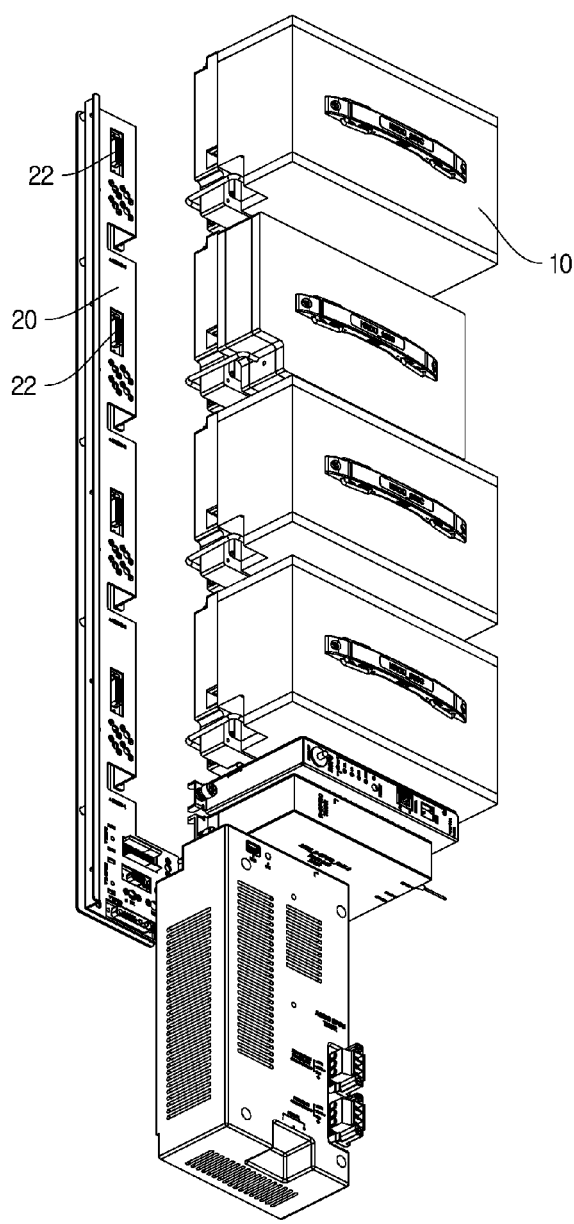
FIGS. 1 and 2 are perspective views of a communication module assembly according to an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The present invention may make various changes and may have a plurality of embodiments, and specific embodiments will now be illustrated in the drawings and described in detail in the detailed description. However, this is not intended to limit the present invention for a particular embodiment, and it should be understood to include all changes, equivalents and alternations which fall within the spirit and scope of the present invention.

The terms used in this application is used to merely describe the particular embodiments and are not intended to limit the present invention. Expressions of the singular numbers include the expressions of the plural numbers unless they are obviously differently expressed in the context. In the present application, it should be understood that the terms, such as "comprising" or "having" are intended to specify the presence of characteristics, numbers, steps, operations, components, parts or a combination thereof described in the specification, but do not previously exclude the possibilities of the presence or addition of one or more other characteristics, numbers, steps, operations, components, parts, and a combination thereof.

Hereinafter, an embodiment of the communication module assembly according to the present invention will be described in detail with reference to the accompanying drawings.

Figure 2:
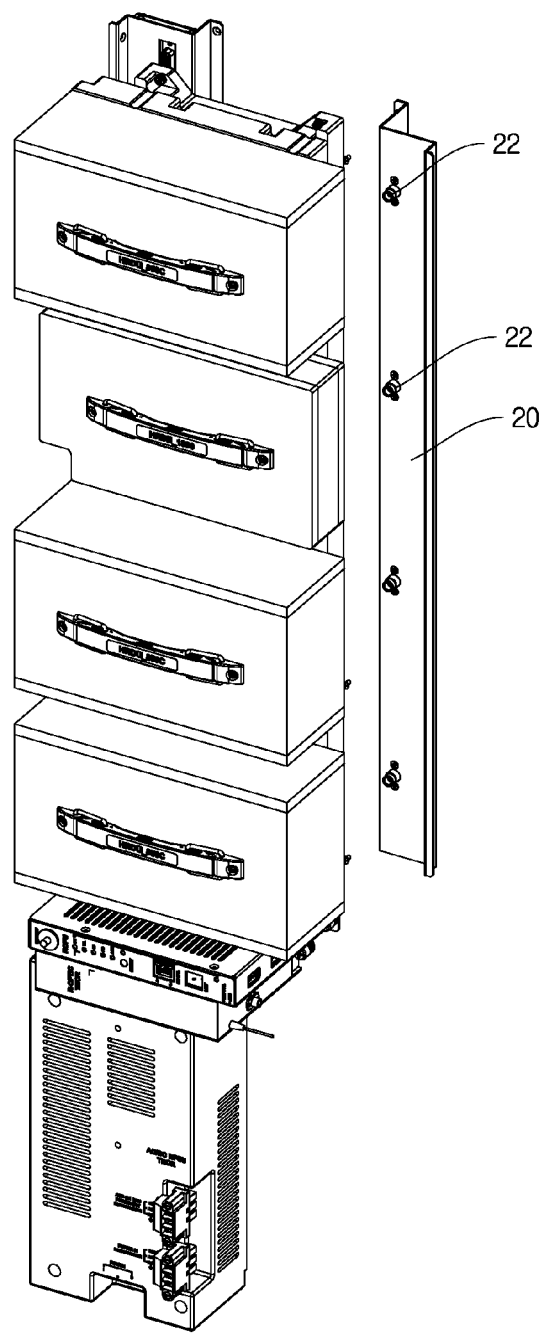
Figure 3:
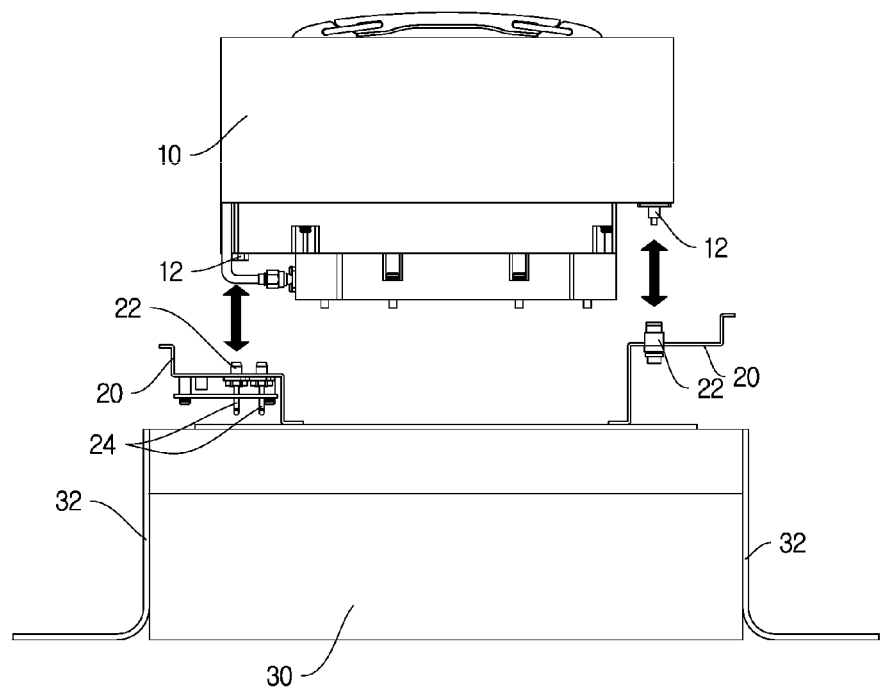
FIG. 3 is a plan view of the communication module assembly according to an embodiment of the present invention.

FIGS. 1 and 2 are perspective views of the communication module assembly according to an embodiment of the present invention, and FIG. 3 is a plan view of the communication module assembly according to an embodiment of the present invention.

According to the illustrated configuration, the communication module assembly according to the present invention is a communication module assembly which is electrically connected to a communication device and is supplied with power and signal, wherein the communication module assembly includes a connection port unit (20) that is supplied with the power and the signal from the communication device; a cable connection portion (24) which is provided in the connection port unit (20), and to which cables electrically connected to the communication device is connected; a plurality of communication modules (10) that is stacked on and connected to the connection port unit (20) in a plug-in type; and a guide means (40, 42) for guiding the communication modules (10) such that the communication modules (10) are connected to the connection port unit (20) in a central direction.

The communication module 10 can be a unit module adopted in an RF relay, for example, one of the unit modules, such as an RF UPC (Up Converter) module, an RF DNC (Down Converter) module, an RF amplifier module, and a filter module, or a combination of the above-described unit modules.

The communication module 10 illustrated in FIG. 1 is constituted by a combination of the above-described unit modules. In addition, the communication module 10 has been described as a unit module adopted in the RF relay, but is not limited thereto, and it can, of course, be a unit module that is adopted in an optical relay, a distribution relay or the like.

The communication module 10 is formed to have an external form as a housing of an approximately rectangular parallelepiped shape as illustrated in the drawings. Moreover, in FIG. 1, the communication module 10 is constituted by three unit modules that are stacked and coupled to one another.

Referring to FIG. 3, a connector 12 is provided on one side of a lower surface of the communication module 10. The connector 12 is a part that is directly connected to a connection port 22 of the connection port unit 20. The connector 12 is connected to the connection port 22 in a plug-in type and is supplied with power and signal of the communication device. In this embodiment, although the connectors 12 are illustrated as being provided on both sides of the lower surface of the communication module 10 and connected to the connection port 22, it is not limited to this, and a plurality of connectors may be configured to be provided on the lower surface of the communication module 10 and connected to the connection port 22.

Also, when the plurality of connection ports unit 20 and connection ports 22 are disposed, a positional error may occur at the time of fastening the communication module 10 with each connection port 22, due to assembly tolerance or the like. In order to solve such a problem, it is possible to improve fastening properties by applying a movable structure to all or a part of the connection port 22 that is provided in the connection port unit 20 or the communication module 10.

For example, the connection port 22 located on the right side on the basis of FIG. 2 in the connection ports can be installed to be movable in the vertical and horizontal directions and the front and back direction. With this, even if the position error occurs during fastening of the communication module 10, the fastening can be smoothly performed by the movable right connection port 22. Moreover, the connection port 22 may be configured, for example, so that the movable housing is supported on the fixed housing by an elastic member, bushing or the like.

Referring to FIGS. 1 and 2 again, the connection port unit 20 consists of a set and is configured to be connected on both sides of the plurality of communication modules 10, respectively. That is, the external form of the connection port unit 20 is formed by a bracket that is formed to be vertically elongated. Moreover, the connection port unit 20 can be provided with a plurality of connection ports 22 at a predetermined interval. The connection port 22 is a portion to which the connector 12 of the communication module 10 is connected, and one or two or more connection portions can be configured for each communication module 10. Referring to FIG. 1, in the connection port unit 20 disposed on the left side, a plurality of connection ports 22 is connected to one communication module 10, and referring to FIG. 2, in connection port unit 20 disposed on the right side, one connection port 22 can be connected to one communication module 10.

Referring to FIG. 3, the connection port unit 20 can be made by approximately bending the frame, and the connection port unit 20 can be coupled to a heat sink 30 for heat dissipation. Moreover, the connection port unit 20 can be provided with cable connection portions 24 to which cables (not illustrated) are directly connected. Thus, when the operator connects the communication module 10 to the connection port unit 20 in a plug-in type in the state in which the cables are connected through the cable connection portions 24, since there is no need to additionally perform the connection and disconnection operations of the cables during replacement of the communication module 10, it is possible to minimize the operation time. In addition, it is possible to miniaturize the overall device, by securing a sufficient space required for the connection and disconnection operations of the cables.

Next, the communication module 10 of FIG. 3 is constituted by coupling of the three unit modules, and the unit module coupled to the lowest part the heat is a signal amplification module and intensely generates heat. Thus, in this embodiment, the heat sink 30 is disposed to come into close contact with the rear of the communication module 10 for the radiation of the signal amplifier module. For reference, reference numeral 32 is an installation bracket that is coupled for the installation of the heat sink 30.

In the following, the guide means for guiding the connection of the communication module 10 will be described in detail with reference to FIGS. 4 to 6.

Figure 4:
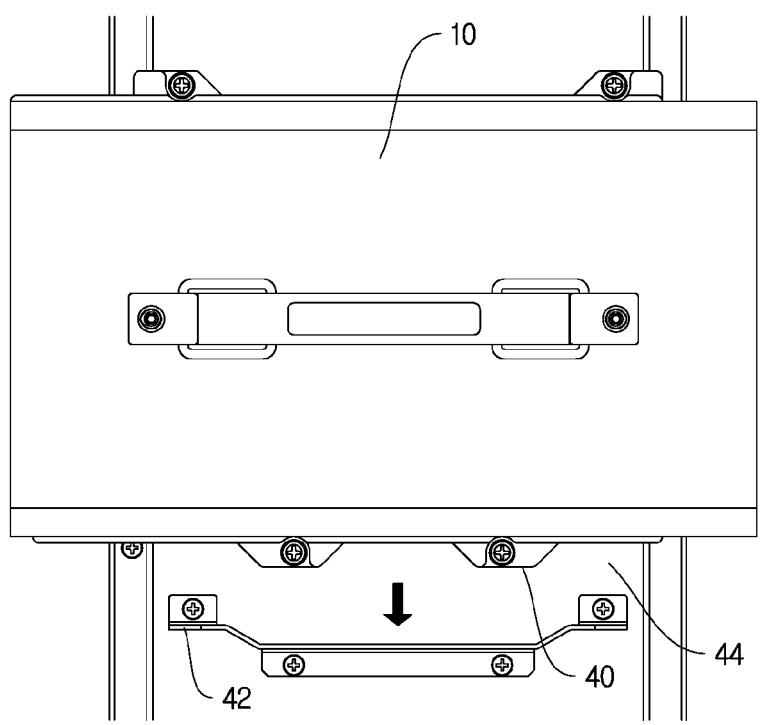
FIG. 4 is a front view of a guide means.
Figure 5:
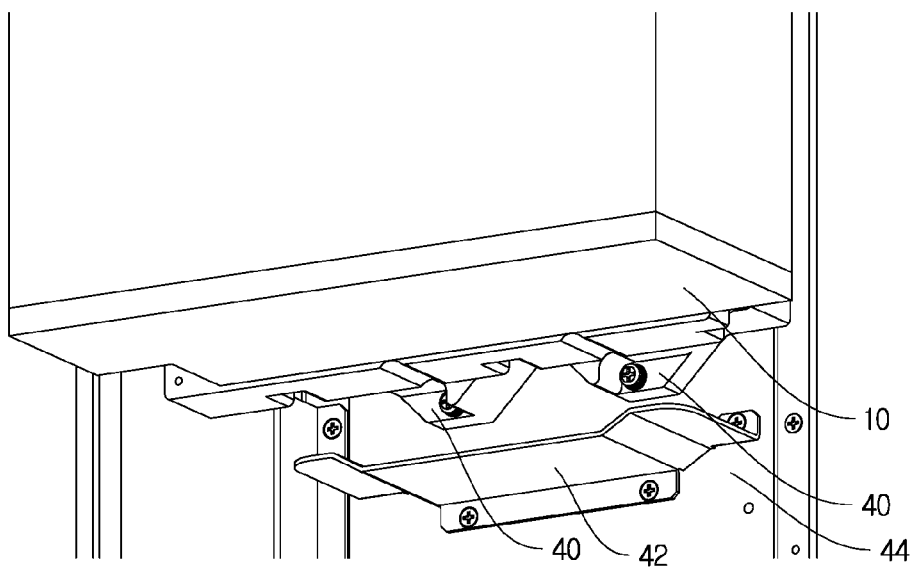
FIG. 5 is a perspective view of FIG. 4.
Figure 6:
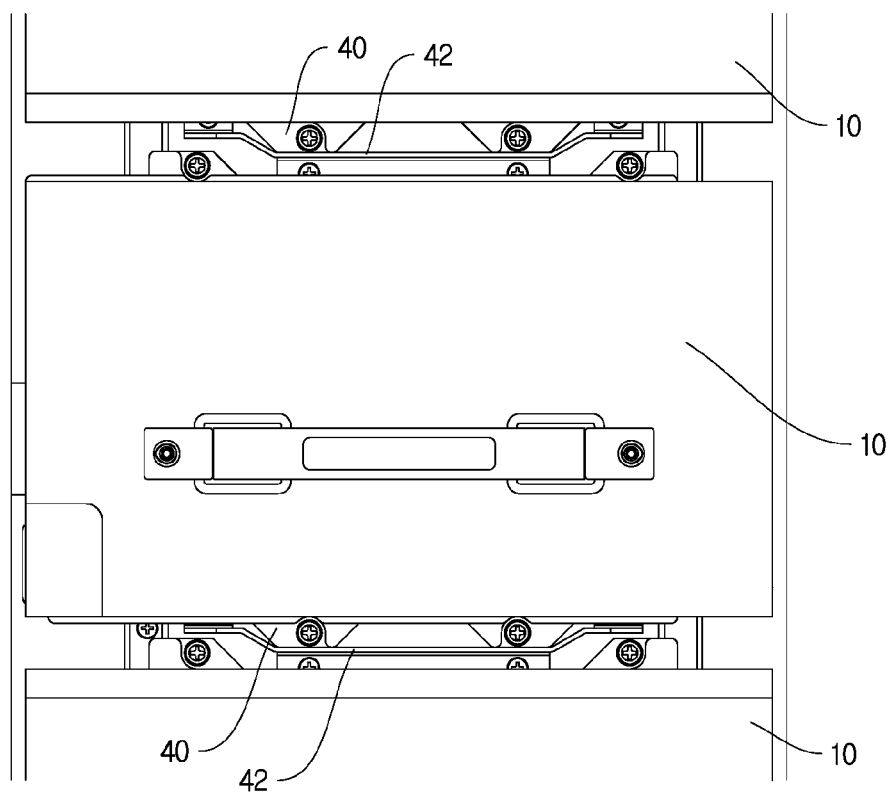
FIG. 6 is a front view illustrating a state in which the communication modules are connected by the guide means.

FIG. 4 is a front view of the guide means, FIG. 5 is a perspective view of FIG. 4, and FIG. 6 is a front view illustrating a state in which the communication module is connected by the guide means.

According to the illustrated configuration, since the connection port 22 is located at the rear of the communications module 10 in the process of connecting the communication module 10 to the connection port unit 20, it may be difficult for the operator to fix it at a fixed position. Thus, in this embodiment, the guide means 40 and 42 are provided so that the communication module 10 can be easily connected to a fixed position of the connection port unit 20.

The guide means 40 and 42 can include guide protrusions 40 provided to protrude from one end of the communication module 10; and guide brackets 42 that are coupled to the heat sink 40 and supports the lower ends of the guide protrusions 40.

The guide protrusions 40 may be formed by coupling the separate injection material to the one side of the lower end side of one communication module 10. Both side ends of the guide protrusions 40 are formed to be inclined so as to approach each other as they go downward. In FIG. 4, although the two guide protrusions 40 are illustrated, one guide protrusion may also be configured, and in this case, the guide protrusion 40 may be more long formed on both sides.

Moreover, the guide bracket 42 is formed so as to correspond to be able to guide the both side ends of the guide protrusion 40 formed to be inclined. That is, the guide bracket 42 can be made by vertically forming the injection material and can be coupled on the heat sink 40 by screws or the like. A portion of the guide bracket 42 formed to be perpendicular to the heat sink 40 will substantially support the guide protrusions 40.

As described above, if the guide protrusions 40 are supported by the guide brackets 42, when the communication module 10 is attempted to be connected to a position other than the fixed position, for example, when the communication module 10 is connected to the connection port unit 20 in a state of being biased to the left or right direction rather than the center, the guide protrusions 40 can be naturally aligned toward the central direction, while being guided by the guide bracket 42. That is, since the communication module 10 has its weight, the communication module 10 can be naturally aligned in the central direction, while being moved downward by its own weight.

Referring to FIG. 6, since the plurality of communication modules 10 can be stacked in a minimum space, it is possible to minimize the size of the entire device without causing an interference with each other. In particular, since there is no need for a space for cable connecting operation inside the housing in which the communication module 10 is housed, protruding latches and hinges can be held inside, and thus, it is possible to reduce the size of the overall device.

While the embodiments of the present invention have been described in detail above, the scope of the present invention is not limited thereto, and various modified and improved forms of those skilled in the art utilizing the basic concepts of the present invention as defined in the following claims also fall within the scope of the present invention.

While the present invention has been described with respect to the specific embodiments, it will be apparent to those skilled in the art that various changes and modifications may be made without departing from the spirit and scope of the invention as defined in the following claims.

The invention claimed is:

1. A communication module assembly which is electrically connected to a communication device and is supplied with power and signal, comprising: a connection port unit that is supplied with the power and the signal from the communication device; a cable connection portion which is provided in the connection port unit, and to which cables electrically connected to the communication device is connected; a plurality of communication modules that is stacked on and connected to the connection port unit in a plug-in type; and a guide means for guiding the communication module such that the communication modules are connected to the connection port unit in a central direction,
wherein the connection port unit is provided with a plurality of connection ports, and at least one of the connection ports is configured to move vertically, horizontally, and back and forth.

2. The system of claim 1, wherein the connection port unit is constituted by a pair that is formed long in a vertical direction, and both sides of the plurality of communication modules are connected to the connection port unit, respectively.

3. The system of claim 1, wherein a heat sink for heat dissipation is installed to be adjacent to the communication modules, and the connection port unit is fixedly coupled to the heat sink.

4. The system of claim 1, wherein the guide means includes guide protrusions provided to protrude from one end of the communication modules; and a guide bracket that is coupled to the heat sink to support lower ends of the guide protrusions.

5. The system of claim 4, wherein both side ends of the guide protrusions are formed to be inclined so as to approach each other as they go downward, and the guide bracket is formed to correspond to the guide protrusions.

* * * * *